Dec. 14, 1971     O. P. PRACHAR     3,626,764

MULTIDIRECTIONAL INERTIAL SENSOR

Filed July 27, 1970

INVENTOR.
Otakar P. Prachar

BY Herbert Furman

ATTORNEY 3,626,764
MULTIDIRECTIONAL INERTIAL SENSOR
Otakar P. Prachar, Santa Barbara, Calif., assignor to
General Motors Corporation, Detroit, Mich.
Filed July 27, 1970, Ser. No. 58,212
Int. Cl. G01p 15/02
U.S. Cl. 73—492                                    7 Claims

ABSTRACT OF THE DISCLOSURE

A cylindrical support has a hollow tubular axial guide mounted on an end wall thereof. An operator is slidably mounted within the guide and spring biased toward actuated position. Balls mounted within radial openings of the guide engage a radially tapered shoulder of the operator to hold the operator in normal position against movement. The balls are held in engagement with the operator shoulder by a retainer slidably mounted on the guide and spring biased axially opposite to the operator. An annular seismic mass surrounds the guide and fits between the retainer and an end wall of the support. Three equally circumferentially spaced conical depressions in each end of the mass mate with like depressions in the retainer and in the support. Each pair of mating depressions receives a ball. When the mass receives an acceleration pulse of predetermined amplitude and time, it shifts radially of the guide, and the camming action of the balls moving within the conical depressions shifts the retainer axially against its spring bias to release the balls from the operator shoulder and in turn release the operator.

---

This invention relates generally to multidirectional sensors and more particularly to an omnidirectional sensor having an operator normally releasably held in an unactuated position and release for movement to an actuated position by movement of a seismic mass laterally of the direction of movement of the operator when subjected to an acceleration pulse of predetermined amplitude and time.

One of the features of the sensor of this invention is that the operator is normally detented against axial movement to actuated position by releasably detent means, with the release means for the detent means also serving to retain the seismic mass against movement unless the required value acceleration pulse is received. Another feature is that the release means for the detent means includes a resiliently biased retainer which normally retains the detent means in detent position and retains the mass against movement, with movement of the seismic mass laterally of the direction of movement of the operator moving the retainer against its bias to release the detent means. A further feature is that the mass is cylindrical and extends between the retainer and support, with one end of the mass having equally spaced conical depressions receiving balls seated in conical depressions in the support, and with the other end of the mass having equally spaced conical depressions receiving balls seated in conical depressions in the retainer whereby movement of the mass causes the balls and depressions at one end thereof to shift the mass axially and in turn cause the balls and depressions at the other end thereof to shift the retainer axially and release the detent means.

Figure 1:
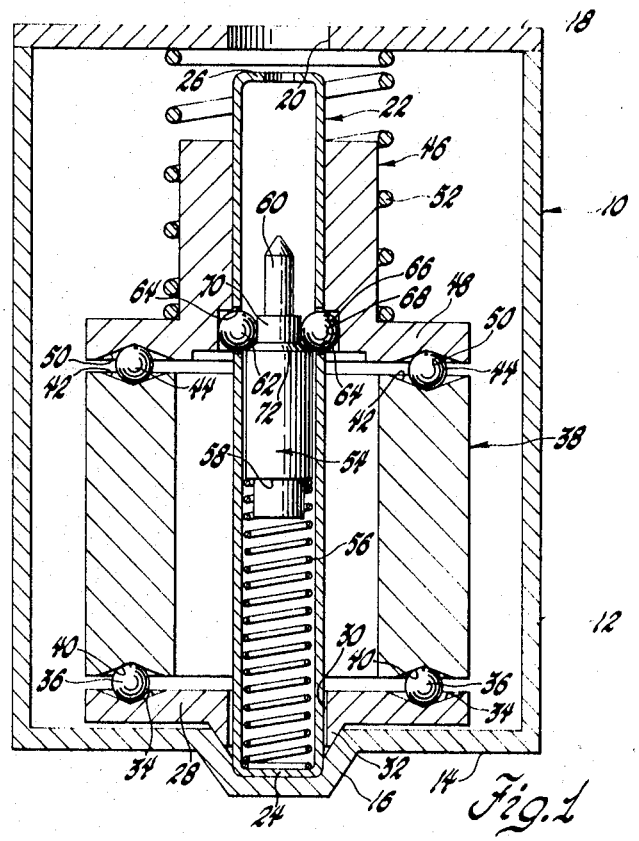
Figure 2:
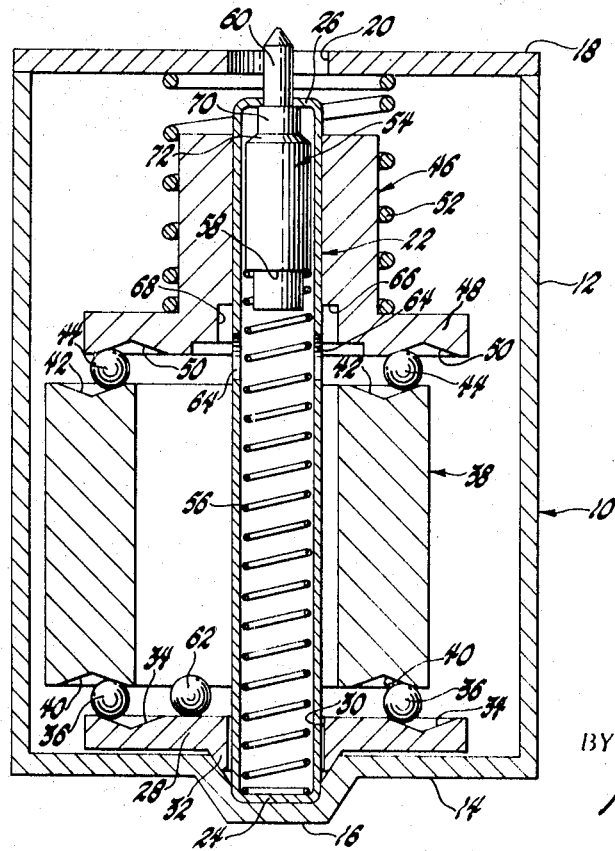

These and other features of the sensor of this invention will be readily apparent from the following specification and drawings wherein:

FIG. 1 is an axial sectional view of a sensor according to this invention, with the sensor being shown in normal or unactuated position; and FIG. 2 is a view similar to FIG. 1 showing the sensor in actuated position.

Referring now to the drawings, a sensor 10 according to this invention includes a cylindrical support or housing 12 having a lower wall 14 provided with a generally frusto-conically shaped embossment 16. The upper wall of the housing 12 is provided by a cover plate 18 which is centrally apertured at 20 and is releasably secured in a conventional manner to the housing 12. A hollow cylindrical axial guide 22 has a lower closed end wall 24 seating on the base wall of the embossment 16, with the guide being suitably secured in a conventional manner to the embossment. The upper end wall 26 of the guide 22 is centrally apertured so as to open the guide outwardly of the housing 12 through the aperture 20. A cylindrical support plate 28 includes a central aperture 30 receiving the guide 22 therethrough and a depending flange 32 which is received within the embossment 16 and suitably secured thereto. Plate 28 includes three like equally circumferentially spaced conical depressions 34, each of which receives a ball 36.

A hollow cylindrical seismic mass 38 surrounds the guide 22 and includes three equally circumferentially spaced conical depressions 40 in its lower end wall which normally mate or open to the depressions 34 and seat on the balls 36. The upper end wall of the mass 38 likewise includes three equally circumferentially spaced conical depressions 42, each of which receives a ball 44. A retainer 46 which is slidably mounted on the guide 22 includes a generally radially extending annular flange 48 which includes three depressions 50 normally mating or opening to the depressions 42 and seating the balls 44. The pairs 34, 40 and 42, 50 of mating depressions are normally aligned axially of the mass. 38. A coil compression spring 52 seats on the cover plate 18 and on flange 48 to normally bias the retainer 46 downwardly and in turn bias the pairs of mating conical depressions into engagement with their respective balls so as to locate the seismic mass 38 against movement either axially or radially of the guide 22.

An operator 54 is slidably mounted within the guide 22. A coil compression spring 56 seats between a radical shoulder 58 of the operator and the lower end wall 24 of the guide 22 to continually bias the operator 54 upwardly of the tube to its actuated position shown in FIG. 2. In this position the firing pin 60 of the operator 54 projects outwardly of the aperture 20 and may either detonate a primer, rupture a diaphragm, or actuate other devices.

The operator 54 is retained in its normal position shown in FIG. 1 by three equally spaced balls 62 which are freely received in radial apertures 64 of the guide 22. Each ball engages the respective radially and axially extending surfaces or shoulders 66 and 68 of the retainer 46 and the axially extending surface or shoulder 70 and the radially tapered shoulder 72 of the operator 54.

The sensor 10 of this invention is particularly intended for use with an air cushion restraint system. Such system may generally include an inflatable cushion, a source of pressure fluid which is blocked against communication with the cushion by a diaphragm, and a sensor such as the sensor of this invention for sensing acceleration pulses above a predetermined threshold value and rupturing the diaphragm, either directly or indirectly, to release the pressure fluid to inflate the cushion.

Should the seismic mass 38 receive an acceleration pulse of the required amplitude and time directed generally radially of the guide 22, the mass will shift laterally of the guide or radially of the guide axis from its FIG. 1 position to its position shown in FIG. 2. As the mass so shifts, the movement of the conical depressions 40 relative to the balls 36 and the movement of the balls 36 relative to depressions 34 will cam or shift the mass 38 axially upwardly as it moves laterally or radially. Likewise the movement of the conical depressions 42 relative to balls 44 and the movement of the balls 44 relative to depressions 50 will shift or cam the retainer 46 axially upwardly to its FIG. 2 position so that the shoulders 66 and 68 no longer oppose or engage the balls 62. The force of the spring 56 in conjunction with the tapered shoulder 72 of the operator thereupon cams the balls 62 outwardly of the apertures 64 so that the balls drop to the plate 28 and in turn the operator 54 is released for movement to actuated position.

Thus, this invention provides an improved omnidirectional sensor.

What is claimed is:

1. A multidirectional sensor comprising, a support including a linear guide, an operator mounted on the guide for linear movement relative thereto between normal and actuated positions, means biasing the operator to actuated position, detent means engageable with the operator to retain the operator in normal position, detent retaining means movably mounted on the support and engageable with the detent means to hold the detent means in engagement with the operator, a seismic mass mounted on the support for movement laterally of the direction of movement of the operator when subjected to an acceleration pulse of predetermined amplitude and time, and means operatively connecting the seismic mass to the detent retaining means to move the retaining means out of engagement with the detent means and release the operator upon movement of the seismic mass laterally of the direction of movement of the operator.

2. A multidirectional sensor comprising, a support including a linear guide, an operator mounted on the guide for linear movement relative thereto between normal and actuated positions, means biasing the operator to actuated position, detent means engageable with the operator to retain the operator in normal position, detent retaining means movably mounted on the support for colinear movement relative to the operator, second means biasing the retaining means into engagement with the detent means to hold the detent means in engagement with the operator, a seismic mass mounted on the support for movement laterally of the direction of movement of the operator when subjected to an acceleration pulse of predetermined amplitude and time, and coacting means operatively interconnecting the seismic mass and the detent retaining means to hold the seismic mass against movement under the action of the second means and to move the retaining means out of engagement with the detent means and release the operator upon movement of the seismic mass laterally of the direction of movement of the operator.

3. A multidirectional sensor comprising, a support including a linear guide, an operator mounted on the guide for linear movement relative thereto between normal and actuated positions, means biasing the operator to actuated position, detent means engageable with the operator to retain the operator in normal position, retaining means mounted on the support for colinear movement relative to the operator, second means biasing the retaining means into engagement with the detent means to hold the detent means in engagement with the operator, a seismic mass, means mounting the seismic mass on the support for bodily movement colinearly of the direction of movement of the operator when subjected to an acceleration pulse of predetermined amplitude and time, and means operatively connecting the seismic mass to the detent retaining means to move the retaining means linearly and out of engagement with the detent means to release the operator upon bodily movement of the seismic mass colinearly of the direction of movement of the operator.

4. A sensor as recited in claim 3 wherein the means mounting the seismic mass on the support include a plurality of conical depressions in one end wall of the seismic mass and a plurality of conical depressions in the support, the depressions being located in mating pairs opening to each other and each such pair of depressions receiving a ball to normally position the seismic mass on the support against movement laterally of the direction of movement of the operator.

5. The combination recited in claim 3 wherein the means operatively connecting the seismic mass to the retaining means include a plurality of conical depressions in an end wall of the seismic mass and a like plurality of conical depressions in the retaining means, the depressions being arranged in mating pairs opening to each other and each pair of mating depressions receiving and seating a ball.

6. A multidirectional sensor comprising, a support including a linear guide, an operator mounted on the guide for linear movement relative thereto between normal and actuated positions, means biasing the operator to actuated position, detent means engageable with the operator to retain the operator in normal position, retaining means mounted on the support for colinear movement relative to the operator, second means biasing the retaining means into engagement with the detent means to hold the detent means in engagement with the operator, a hollow seismic mass surrounding the guide and including a plurality of conical depressions in one end thereof receiving a plurality of balls mounted on the support to bodily shift the seismic mass colinearly of the direction of movement of the operator when subjected to an acceleration pulse of predetermined amplitude and time, and means operatively connecting the seismic mass to the retaining means to move the retaining means out of engagement with the detent means and release the operator upon bodily shifting movement of the seismic mass colinearly of the direction of movement of the operator.

7. The sensor recited in claim 6 wherein the means operatively connecting the seismic mass to the retaining means include a plurality of conical depressions in the other end of the seismic mass and in the retaining means, and a ball respective to and received within pairs of mating depressions in the mass and retaining means.

References Cited
UNITED STATES PATENTS

| | | | |
|---|---|---|---|
| 3,117,196 | 1/1964 | Vincent | 200—61.53 |
| 3,560,681 | 2/1971 | Webber | 200—61.45 |

JAMES J. GILL, Primary Examiner

U.S. Cl. X.R.

73—514; 200—61.45